United States Patent [19]

Meirana

[11] Patent Number: 5,342,470
[45] Date of Patent: Aug. 30, 1994

[54] METHOD AND APPARATUS FOR WELDING OF PLASTIC PIPE ELEMENTS

[75] Inventor: Giovanni Meirana, Borghetto S. Spirito, Italy

[73] Assignee: MKM S.R.L., Albenga, Italy

[21] Appl. No.: 784,436

[22] PCT Filed: May 7, 1990

[86] PCT No.: PCT/IT90/00048

§ 371 Date: Dec. 12, 1991

§ 102(e) Date: Dec. 12, 1991

[87] PCT Pub. No.: WO90/14941

PCT Pub. Date: Dec. 13, 1990

[30] Foreign Application Priority Data

May 18, 1989 [IT] Italy .................. 47967 A/89

[51] Int. Cl.$^5$ .................................................. B29C 27/02
[52] U.S. Cl. .................. 156/304.2; 138/155; 156/514
[58] Field of Search .............. 156/304.2, 514; 138/155; 285/915, 197

[56] References Cited

U.S. PATENT DOCUMENTS

| | | | |
|---|---|---|---|
| 3,634,167 | 1/1972 | Plontke | 156/304.2 |
| 3,723,229 | 3/1973 | Hutton | 156/580 |
| 3,966,528 | 6/1976 | Christie | 156/293 |
| 4,174,248 | 11/1979 | Caroll | 156/538 |
| 4,695,335 | 9/1987 | Lyall | 138/155 |

FOREIGN PATENT DOCUMENTS 1401370 4/1965 France .
1246909 9/1971 United Kingdom .
2057965 4/1981 United Kingdom .

OTHER PUBLICATIONS

Hackh's Chemical Dictionary, p. 536, 1969.

*Primary Examiner*—Tim Heitbrink
*Attorney, Agent, or Firm*—Mason, Fenwick & Lawrence

[57] ABSTRACT

Equipment for welding pipe elements of a melt-weldable plastic material comprises a heatable metal plate and first and second heat-conductive elements attached respectively to first and second opposed faces of the plate. The first element has a concave melting surface of elliptical cross-section which is complementary in shape to that of the circumference of a manifold pipe to be heat-welded. The melting surface is raised and has a reduced wall thickness along its minor axis and is depressed and has an increased thickness along its major axis. A pipe fitting for use with the welding tool has a welding end which is substantially identical in configuration to that of the melting surface of the first element. The second element is complementary in shape to the end of the pipe fitting for melting the welding end of the pipe fitting. In a process for welding the pipe fitting to the pipe manifold using the welding tool, the heated first and second elements are brought into contact with the circumference of the manifold pipe and the welding end of the pipe fitting, respectively, until incipient melting occurs. The first element is aligned with a hole in the manifold using a non-conductive central element inserted in a central axial cavity in the first element. The melted areas are then brought into contact with each other under pressure and allowed to solidify.

8 Claims, 4 Drawing Sheets

METHOD AND APPARATUS FOR WELDING OF PLASTIC PIPE ELEMENTS

BACKGROUND OF THE INVENTION

1. Field of the Invention

This invention relates to equipment for welding plastic pipe elements which are melt-weldable, to a welding process in which said equipment is employed, to the pipe fittings designed to be employed with said equipment, as well as to the prefabricated pipe elements obtained by means of said equipment and employing said welding process.

In particular, the invention relates to manifolds, or to a part of the same, or to plants for distribution of water or of other liquid materials, said plants being provided with particular fittings obtained employing the equipment according to the present invention, the manifold-fittings assembly complex being effected with a melt-weldable plastic material, such as for instance polyethylene, polypropylene, etc.

These types of manifolds or branched connections can be employed in any type of plant for the distribution of hot and/or cold liquids, both in an open and in a closed circuit, such as for instance heating or cooling plants, or irrigation plants and so on.

A particular application of the invention is in radiant-panels heating plants, in which plants plastic material pipe coils are provided, as members embedded within concrete castings or within other masonry elements, or within banks (as for instance in agriculture).

2. Related Art

The connection between the manifold fed by the water distribution system and the pipe coil or other plant branches, both made up of a plastic material, or of iron pipes bearing branch pipes of a plastic material, is effected at the present time by means of fittings of various kinds (as for instance pressure fittings, or threaded fittings, or hanger fittings and so on) or by means of combinations thereof.

This type of connection gives rise to a number of different drawbacks, as for instance a loss of seal with time or, sometimes, even an immediate seal loss.

Accordingly, the adaption has been conceived of a welding connection without weld material which is effected by melting the portions to be connected.

In some kinds of plants, as for instance in sewer systems, equipment and welding processes are employed which are based on the operation of heating the surfaces to be joined, by electrically-heated metal surfaces, until incipient melting occurs of the surfaces to be joined. The heated surfaces are then brought in contact with one another by exerting a suitable pressure.

In particular, one of the processes employed at present makes use of a metal plate or "mirror", which has planar, parallel surfaces, and incorporates electrical resistances which heat the plane surfaces up to the desired temperature.

This kind of procedure and the related equipment is advantageously usable for effecting butt welding operations between plane surfaces.

In case it is necessary, as always occurs in the kind of plants mentioned above, to accomplish welding between the pipe or manifold and branches, it is impossible to perform welding operations for branches or parts of pipe coil.

In particular, when the direct welding between the manifold and the pipe coil is adopted, problems occur due to the fact that, while the manifold can undergo length changes because of thermal expansion, the pipe coil can be blocked within the structure of masonry so that it cannot shift transversely. Because of that reason, relevant stresses occur in the connection zone.

Moreover, the welding operation performed at the point corresponding to the intersection between two hollow cylinders having walls of uniform thickness, i.e. between the manifold and the pipe coil, gives a weld whose contact surface consists of a strip of variable width along the circumference of the smallest pipe, from a minimum width equal to the thickness of the pipe itself, up to a higher value, so that non-uniform melting is obtained along the whole contour and as a consequence a poor quality weld is obtained.

In G.B. patent No. 1,246,909, a method and apparatus for welding together tubes of plastics material are described.

The method described comprises machining an approximately semi-cylindrical recess in one of the tubes at the position at which it is to be joined to the other of the tubes to provide it with a joint surface complementary to a joint surface formed by a portion of the wall of the other of the tubes, applying said joint surfaces of the tubes to opposite sides of a heated member shaped to correspond to said joint surfaces to melt the tubes at said joint surfaces, removing the heated member from between said joint surfaces and pressing said joint surfaces of the tubes into abutment one with the other to permit the materials of the tubes to fuse together to form a joint.

SUMMARY OF THE INVENTION

With a view to what has been discussed above, the Applicant provides equipment that allows two pipe elements to be welded, as a by-pass at an angle, which are melt-weldable, said equipment permitting an optimal weld to be obtained and the weld itself to be limited, when pipelaying the plant, to a simple butt welding between the fitting and the pipe coil or any other element.

These and other results are obtained employing a technology that avoids directly welding pipe coil on the manifold, and that provides the realization of prefabricated members which are made up of a manifold and a fitting, which are to be simply butt welded in the following, employing the usual procedures, with the pipe coil, and which allows an absolutely uniform weld between the manifold and the fitting to be obtained.

It is a further object of the present invention to effect a fitting, obtained by pressure die-casting, which is provided with an end to be welded to the manifold or part of a pipe, said end being of a complementary shaped surface so as to couple exactly with the cylindrical surface of the manifold itself, and having the end thereof welded to the manifold, said end further being of a variable thickness along its contour.

Accordingly, it is a specific object of the present invention to provide equipment for welding plastic material, melt-weldable pipe elements, said equipment comprising a metal plate having planar, parallel surfaces, and provided with means for heating the plane surfaces, a first and second element, formed of heat conductive material, respectively for melting the side surface of a first and a second pipe to be welded, in which the first and second elements are two separate welding elements, in which the first pipe is provided with a hole, in which the second element is shaped at one end to match with the shape of the second pipe to be welded by a butt welding to the first pipe, around the hole, and so as to correspond to the melting surface defined on the first pipe by the first element; the first and second elements being provided with a back surface for contact with the flat plate, as well as provided with means for coupling with the plane surface of the plate. The first member is of outer elliptical cross-section, and has an edge which is raised at the points corresponding to the minor axis of the ellipse, and has a reduced thickness at the points corresponding to the major axis of the ellipse. The first member is provided with a central member formed of a nonconducting material, having a diameter corresponding to the diameter of a hole provided in the first pipe.

Preferably, the first and second elements will be formed of steel or aluminum, and they can be coated with Teflon or any other similar inert material.

Further according to the present invention, the central member arranged within the first element and made up of a ceramic material, is threaded inside the first element.

Further according to the present invention the means for coupling the first and the second elements with the plate comprise a screw passing through the flat back surface of the first element, through a hole formed in the plate and coupled with a threaded seat provided in the second element.

Moreover, it is an object of the present invention to provide a process for welding plastic material melt-weldable pipe elements comprising the steps of:

assembling the first element and the second element on the opposite plane surfaces of the plate;

inserting the central member in the first element during assembly of the first element with the second element;

heating the melting plate with the consequent heating of the first and the second elements;

bringing the lateral surface of a first pipe, which has been previously drilled and deoxidized in the part to be melted by means of a scraping device, into contact with the melting surface of the first element;

bringing the head surface of a pipe length, the head having been previously shaped, into contact with the melting surface of the second element;

heating without pressing until incipient melting is achieved of the two parts to be melted; and bringing the two melted surfaces into contact under pressure and waiting a few seconds to allow the molten material to solidify.

It is a further object of the invention also to provide a straight or a bent fitting element whose head is complementary in shape to the second element, the fitting element also having a cylindrical cross-section for effecting the welding operation by butt welding with the pipe coil or any other member.

Moreover, the pipe elements realized employing the equipment and the process according to the present invention are also to be considered as included in the realm and scope of the priority rights of the present application for a patent of industrial invention, the elements comprising at least a manifold on which at least a fitting pipe is welded, the fitting pipe having an inner circular cross-section and an outer cross-section which, at the points corresponding to the weld zone, is of such shape as to define a contact surface of substantially constant width and of maximum wall thickness at the points corresponding to the maximum stress zone.

Said fitting pipe, of the kind disclosed above, can be straight or bent, and it will preferably be of elliptical cross-section, at the points corresponding to the weld zone.

BRIEF DESCRIPTION OF THE DRAWINGS

This invention will be disclosed in the following according to some preferred embodiments of the same with particular reference to the figures of the enclosed drawings wherein.

DETAILED DESCRIPTION OF THE PREFERRED EMBODIMENTS

The equipment for performing the welding according to the present invention is illustrated in FIGS. 1–8.

It comprises a metal plate 1 or "mirror" having two parallel, planar faces 1' and 1" and having incorporated therein some electrical resistances (not shown) that cause the heating of said faces 1' and 1" up to the desired temperature.

Figure 1:
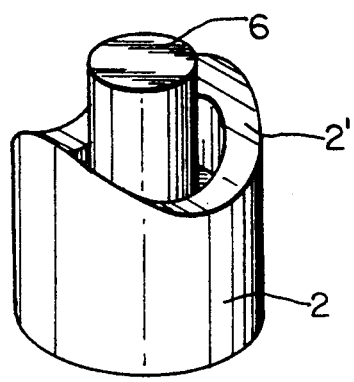
FIG. 1 is a perspective view of the first element of the device according to this invention with the central member extending therefrom.
Figure 2:
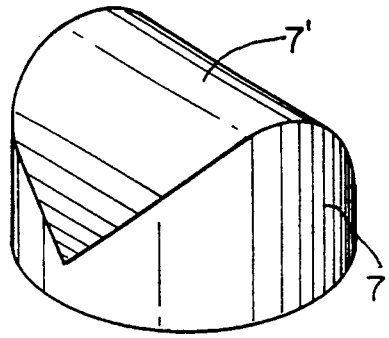
FIG. 2 is a perspective view of the second element of the device according to this invention.
Figure 4:
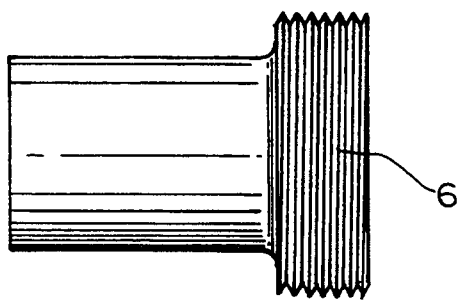
FIG. 4 is a side view of the central member of FIG. 3.
Figure 3:
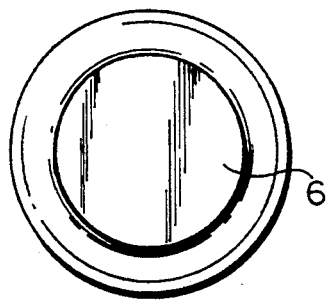
FIG. 3 is a plan view of the central member in the first element shown in FIG. 1.

A first element 2 is configured to have a melting surface 2' at one end which is concave and elliptical (see in particular FIG. 1). The contact surface of the melting surface 2' on the manifold 9, at the points corresponding to the weld zone with the fitting, is made up of a strip whose width varies along the circumference of the manifold 9 itself. The minimum thickness of the melting surface 2' and thus the strip along the minor axis of the melting surface 2' is equal to that of the manifold itself, or of the branch pipe. The thickness of the strip and the melting surface 2' is thicker at the longitudinal axis of the manifold pipe, i.e., along the major axis of the melting surface.

The first element 2 is formed of a heat-conducting material, as for instance steel or aluminum.

Figure 5:
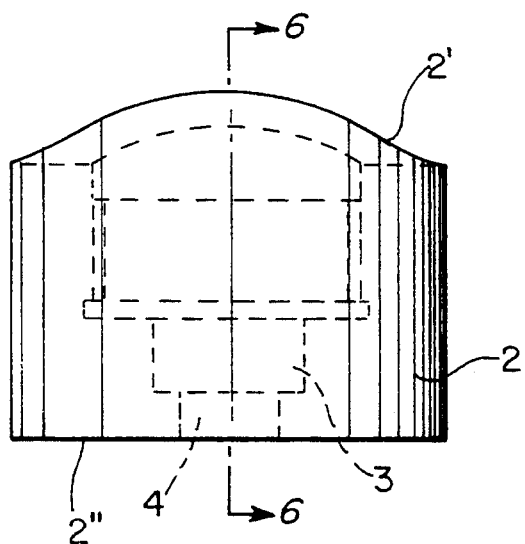
FIG. 5 is a side view of the first element shown in FIG. 1 without the central member of FIG. 3.
Figure 6:
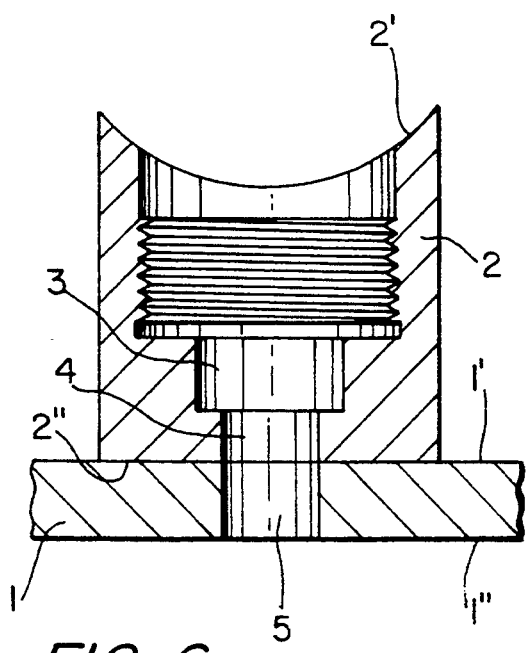
FIG. 6 is a vertical cross-sectional view on line 6—6 of FIG. 5 of the first element of FIG. 5 on the plate of the device according to the present invention.
Figure 8:
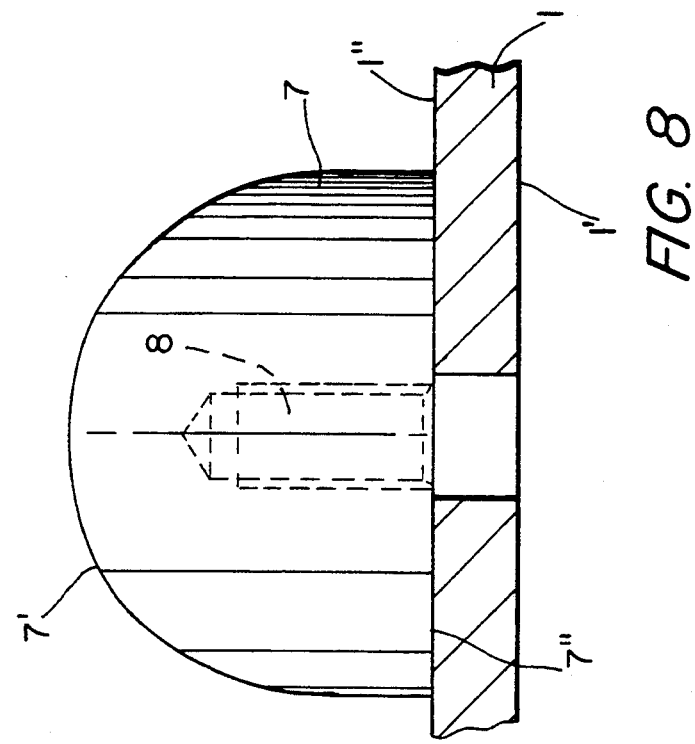
FIG. 8 is a side view of the first element of FIG. 2 arranged on the plate of the device according to this invention with the plate shown in cross-section.
Figure 7:
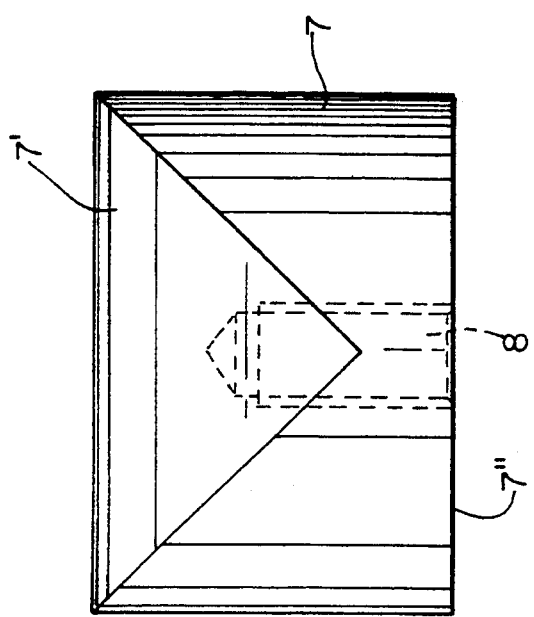
FIG. 7 is a side view of the second element of FIG. 2.

As shown in FIGS. 5 and 6, the first element 2 has a surface 2″, opposite to the surface 2′, which is a flat surface that couples with the surface 1′ of the plate 1.

A seat 3 for the head of a screw (not shown) is formed inside the first element 2, said screw, passing through the hole 4, being inserted into the hole 5 of the plate 1.

A central element 6 is arranged within the inner cavity of the element 2, said central element projecting through the surface 2′ and being of a diameter of such size as to match the hole obtained in the manifold, at the point where the fitting is to become coupled.

Said central element 6, consisting of an insulating material of ceramic type, allows the correct positioning of the melting surface 2′ on the welding zone of the manifold itself to be performed by insertion of central member 6 into the hole in the manifold.

The equipment according to the present invention further comprises a second element 7 (see FIGS. 2, 7 and 8) that has a melting surface 7′ which is complementary with the shape of a depression formed in the head of a branch fitting 10, which in its turn, as will be evident from FIGS. 10–15, has a welding surface 10′ defined by the depression which exactly coincides with the contact surface effected on the manifold or pipe lengths by the first element 2. Thus, it will be appreciated that the melting surface 7′ of the second element 7 is complementary in shape to the melting surface 2′ of the first element.

Moreover, said second element 7 also has a flat surface 7″ complementary in shape to the surface 1″ of the plate 1 and is provided with a thread seat 8 for coupling with the screw already mentioned above.

The second element 7 also is formed of a good heat-conducting material.

The welding operation performed by means of the equipment according to the present invention is carried out after all components mentioned above have been assembled, by heating the equipment itself through the electrical resistances and putting the manifold fitting zone in contact with surface 2′ of the element 2, and the surface of the fitting pipe 10 in contact with the surface 7′ of the second element 7; after the incipient melting of the two surfaces to be welded is achieved, the two surfaces in question are brought into contact and a sufficient pressure is exerted so that a perfect weld is obtained.

An example of a product obtained employing the equipment according to this invention is illustrated in the FIGS. 9–16.

Figure 9:
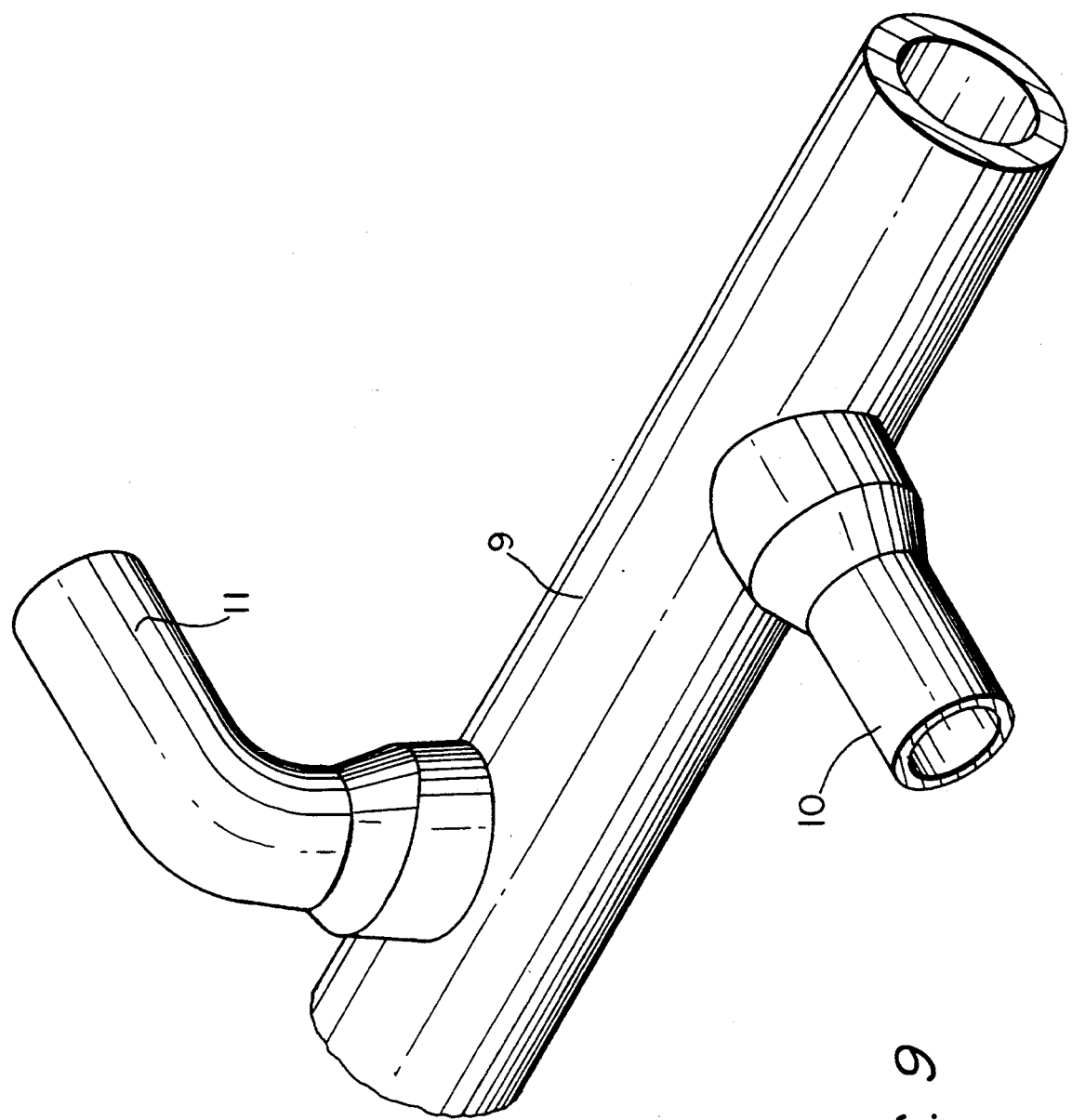
FIG. 9 is a perspective view of an example of a manifold-fitting effected by means of the device according to the present invention.
Figure 10:
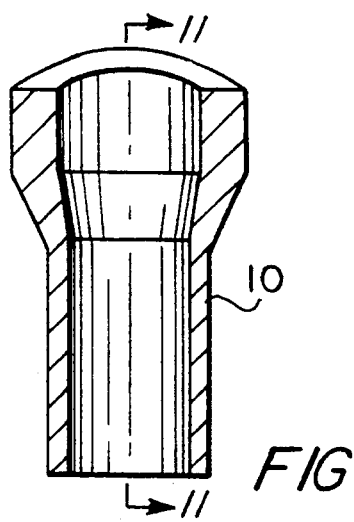
FIG. 10 is a first cross-sectional vertical view of a first fitting.
Figure 11:
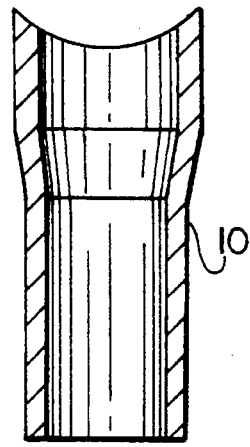
FIG. 11 is a cross-sectional vertical view of the fitting of FIG. 10 taken along line 11—11 of FIG. 10.
Figure 12:
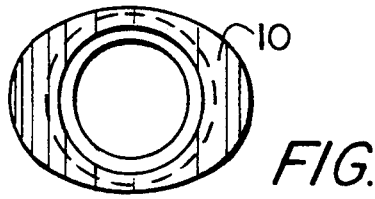
FIG. 12 is a plan view of the fitting of FIG. 10.
Figure 13:
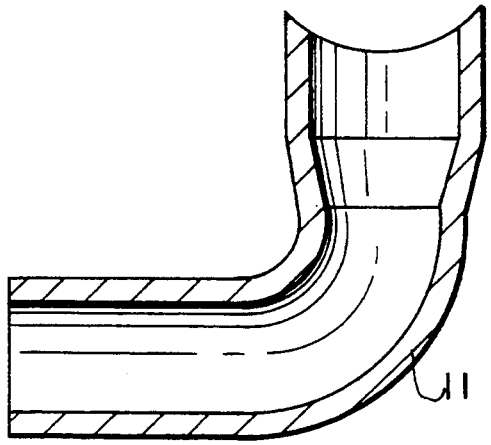
FIG. 13 is a first cross-sectional vertical view of a second fitting.
Figure 14:
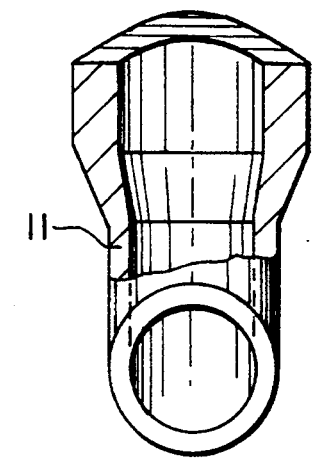
FIG. 14 is a view of the second fitting partially broken away.
Figure 15:
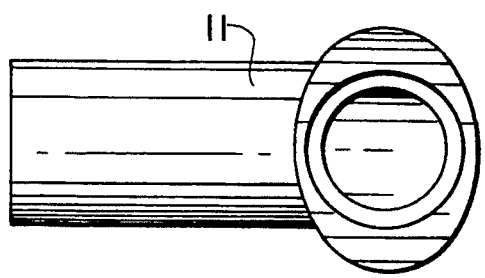
FIG. 15 is a plan view of the fitting shown in FIG. 13.

In particular, FIG. 9 illustrates a manifold 9 bearing two fittings, one of them being of the straight type and indicated by the reference numeral 10, while the other one is of the bent type and is indicated by the reference numeral 11.

The special fittings (of the straight or the bent type) according to this invention are visible in the FIGS. 10–15 and can be obtained by pressure die-casting with already commercially available machines, by previously constructing a suitably shaped die built for the specific shapes desired.

It can be observed that the outer wall of the first length of the fitting 10 or 11 (see also the FIGS. 1–16), starting from the welding zone of the manifold 9, has a thickness which is variable along the circumference.

Accordingly, the fitting 10 or 11 has a wall delimited by two coaxial cylindrical surfaces, the inner one of which is of circular cross-section whereas the outer one is of elliptical cross-section whereas the outer one is of elliptical cross-section having the same dimensions as the concave elliptical head on the side of the manifold to which the fitting is to be welded.

Thus the result is obtained of having the maximum wall thickness at the point corresponding to the maximum mechanical stress zone of the weld, and the minimum thickness at the zone where the contact surface has a width larger than the thickness of the fitting pipe. Thus the contact strip between the fitting 10 or 11 and the manifold 9 is of substantially constant width.

In contrast, the free end of the fitting 10 or 11 is of circular cross-section so that it can be welded merely by butt welding to the pipe coil which is not shown.

Figure 16:
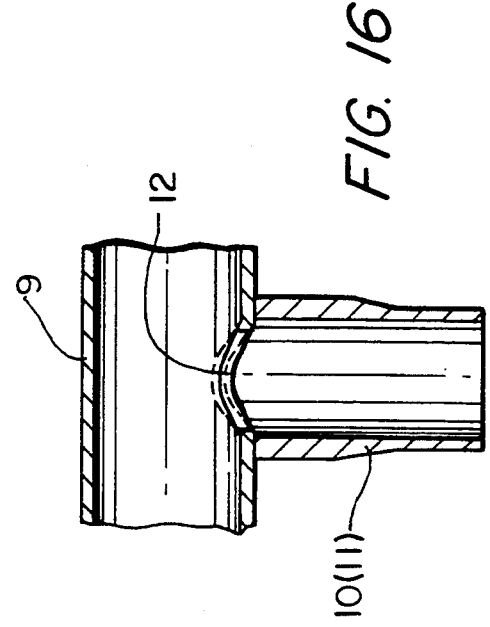
FIG. 16 is a cross-sectional vertical view of a weld at the point between a manifold and a fitting.

FIG. 16 shows the result of the welding between the manifold 9, at the point corresponding to the hole 12, and the fitting 10 (or 11).

This invention has been disclosed with specific reference to some preferred embodiments of the same, but it is to be understood that modifications and/or changes can be introduced in the same by those who are skilled in the art without departing from the spirit and scope of the invention for which a priority right is claimed.

I claim:

1. A process for welding an end of a pipe fitting to a manifold pipe, comprising the steps of:
   (a) providing a manifold pipe formed of a plastic, melt-weldable material and having a circumference;
   (b) forming a hole through the circumference of the manifold pipe and deoxidizing the manifold pipe in the area to be melt-welded around the hole;
   (c) providing a pipe fitting formed of a plastic, melt-weldable material, the pipe fitting having an end for welding to the manifold pipe around the hole, the welding end being concave and having an elliptical outer transverse cross-section complementary in shape to the circumference of the manifold pipe, the welding end being raised and having a reduced thickness along the minor axis of the transverse cross-section and being depressed and having an increased thickness along the major axis of the transverse cross-section;
   (d) providing a welding tool comprising:
      a heat-conductive plate having planar, opposed first and second faces, and means for heating the first and second faces;
      a first element formed of a heat conductive material and having a melting surface at one end, a back surface at an opposite end, and an inner axial cavity, the melting surface of the first element being substantially identical in shape to the welding end of the pipe fitting, the back surface being planar for mating contact with the first face of the plate;
      a central member provided in the axial cavity of the first element and extending outwardly of the melting surface of the first element, the central member having an outer diameter corresponding to the diameter of the hole in the manifold pipe and being formed of a non-conducting material;
      a second element separate from the first element and formed of a heat conductive material and having a melting surface at one end and a back surface at an opposite end, the melting surface of the second element being complementary in shape to the melting surface of the first element and to the end of the pipe being heat welded to the manifold pipe, and the back surface of the second element being planar for mating contact with the second face of the plate; and a fastener fastening the first and second elements to the first and second faces, respectively, of the plate;

(e) heating the first and second elements by heating the plate;

(f) bringing the melting surface of the heated first element into contact with the circumference of the manifold pipe at the hole while aligning the melting surface of the first element relative to the hole by inserting the central member in the hole, and bringing the melting surface of the heated second element into contact with the welding end of the pipe fitting;

(g) heating the circumference of the manifold pipe at the hole and the welding end of the pipe fitting with the first and second elements, respectively, without pressing, until incipient melting of the manifold pipe at the hole and the welding end of the pipe fitting occurs, to define to melted surfaces;

(h) bringing the melted surfaces into contact with each other under pressure; and (i) allowing the melted surfaces to solidify.

2. Apparatus for welding an end of a pipe fitting to a manifold pipe, the pipe fitting and the manifold pipe being formed of a plastic, melt-weldable material, and the manifold pipe having a circumference and a hole through the circumference, said apparatus comprising:

a heat-conductive plate having planar, opposed first and second faces, and means for heating said first and second faces;

a first element formed of a heat conductive material and having a melting surface at one end, a back surface at an opposite end, and an inner axial cavity, said melting surface of said first element being concave and having an elliptical outer transverse cross-section complementary in shape to the circumference of the manifold pipe, said melting surface of said first element being raised and having a reduced thickness along the minor axis of said transverse cross-section and being depressed and having an increased thickness along the major axis of said transverse cross-section, said back surface being planar for mating contact with said first face of said heat-conductive plate, whereby said melting surface is substantially identical in shape to the end of the pipe fitting being heat welded to the manifold pipe;

a central member provided in said axial cavity of said first element and extending outwardly of said melting surface of said first element, said central member having an outer diameter corresponding to the diameter of the hole in the manifold pipe and being formed of a non-conducting material;

said second element formed of a heat conductive material and separate from said first element and having a melting surface at one end and a back surface at an opposite end, said melting surface of said second element being complementary in shape to said melting surface of said first element and to the end of the pipe being heat welded to the manifold pipe, and said back surface of said second element being planar for mating contact with said second face of said heat-conductive plate; and a fastener fastening said first and second elements to said first and second faces, respectively, of said heat-conductive plate.

3. The apparatus of claim 2, wherein said first and second elements are formed of steel.

4. The apparatus of claim 2, wherein said first and second elements are formed of aluminum.

5. The apparatus of claim 2, wherein said first and second elements are coated with a non-stick material.

6. The apparatus of claim 2, wherein said central member is formed of a ceramic material.

7. The apparatus of claim 2, wherein said central member threadably engages said axial cavity.

8. The apparatus of claim 2, wherein said back surface of said first element has an axial seat therethrough, back surface of said second element has a threaded axial seat therethrough, and said heat-conductive plate has a hole extending therethrough between said first and second faces; and wherein said fastener comprises a screw passing through said back surface of said first member, through said hole in said plate, and threadably engaging said threaded seat in said back surface of said second member.

* * * * *